United States Patent

[11] 3,603,739

[72] Inventor James O. Edson
Mansfield Township, Warren County, N.J.
[21] Appl. No. 885,825
[22] Filed Dec. 17, 1969
[45] Patented Sept. 7, 1971
[73] Assignee Bell Telephone Laboratories, Incorporated
Murray Hill, N.J.

[54] DIGITAL TRANSMISSION SYSTEM EMPLOYING IDENTIFIABLE MARKER STREAMS ON PULSES TO FILL ALL IDLE CHANNELS
4 Claims, 3 Drawing Figs.

[52] U.S. Cl. .......... 179/15 AL, 179/2 DP, 179/15 BS
[51] Int. Cl. .......... H04j 3/06
[50] Field of Search .......... 179/15 AL, 2 R, 2 DP, 15 BD, 15 BS; 340/172.5; 325/4

[56] References Cited
UNITED STATES PATENTS

| | | | |
|---|---|---|---|
| 2,406,165 | 8/1946 | Schroeder | 179/15 BS |
| 2,520,185 | 8/1950 | Van Mierlo | 179/15 AL |
| 2,547,001 | 4/1951 | Grieg | 179/15 DC |
| 3,214,734 | 10/1965 | Whitehead | 179/15 AL |

*Primary Examiner*—Kathleen H. Claffy
*Assistant Examiner*—David L. Stewart
*Attorneys*—R. J. Guenther and E. W. Adams, Jr.

ABSTRACT: N-digital-sources distributed along a one-way transmission system are multiplexed by having the first such source insert its information in the first time slot of a frame which is defined by apparatus associated with the first source and predetermined pulse signals in each of the other time slots. Apparatus associated with the next source along the transmission system recognizes the location of the second time slot of the frame by examining the received signal to ascertain the existence of one of the predetermined signals in one time slot and a signal not having the characteristics of one of said predetermined signals in the preceding time slot. The apparatus associated with the second source then deletes the predetermined signal from the second time slot and inserts its information in that slot. This process is repeated by each source along the transmission line, with each source inserting its information in the next succeeding time slot.

INVENTOR
J. O. EDSON
BY [signature]
ATTORNEY

TIME SLOTS

| FRAME | 1 | 2 | 3 | 4 | 5 | 6 | 7 | 8 | 9 | 10 |
|---|---|---|---|---|---|---|---|---|---|---|
| 1 | 1 | 0 | 1 | 1 | 0 | 0 | 1 | 1 | 0 | 0 |
| 2 | 0 | 0 | 1 | 1 | 0 | 0 | 1 | 1 | 0 | 0 |
| 3 | 1 | 1 | 0 | 0 | 1 | 1 | 0 | 0 | 1 | 1 |
| 4 | 1 | 0 | 1 | 1 | 0 | 0 | 1 | 1 | 0 | 0 |
| 5 | 0 | 1 | 1 | 1 | 0 | 0 | 1 | 1 | 0 | 0 |
| 6 | 1 | 1 | 0 | 0 | 1 | 1 | 0 | 0 | 1 | 1 |
| 7 | 0 | 0 | 1 | 1 | 0 | 0 | 1 | 1 | 0 | 0 |
| 8 | 0 | 1 | 1 | 1 | 0 | 0 | 1 | 1 | 0 | 0 |

DATA SLOTS (slots 1–2) · MARKER (slot 3) · FILLER (slots 4–10)

DIGITAL TRANSMISSION SYSTEM EMPLOYING IDENTIFIABLE MARKER STREAMS ON PULSES TO FILL ALL IDLE CHANNELS

GOVERNMENT CONTRACT

The invention herein claimed was made in the course of or under a contract with Naval Electronic Systems Command.

BACKGROUND OF THE INVENTION

This invention relates to digital transmission systems and more particularly to a digital transmission system wherein identifiable marker streams of pulses are employed to fill all idle channels and provide a moveable frame marker.

There are many instances in which sources of digital information are located at points distant from one another and it is desired to transmit the information from each of these sources to a common receiver by means of a single transmission line. For example, in an aircraft there may be many data sources each representing an instrument reading which should be transmitted to a common data receiver in the aircraft. The simplest approach to transmitting these signals on a single transmission line would be to insert the information from each such source in a predetermined time slot of a transmission line which extends from the most distant source, thence to each source and then to the receiver. Convention techniques for applying these signals to the transmission line would consist in assigning each source a predetermined time slot and providing counting apparatus at each source to locate the assigned time slot with respect to a framing pulse. Such a system requires that each source have elaborate counting apparatus individually wired or adjusted in order to ascertain the time of occurrence of the predetermined time slot in which it is to insert its information. It is an objective of this invention to eliminate the need for individually designed counting apparatus at each such source and thereby provide a simple and reliable pulse-transmission system.

SUMMARY OF THE INVENTION

In accordance with this invention the data signals from the source most distant from the receiver are inserted in a first time slot of a frame of N bits, where N= the number of sources to be multiplexed and predetermined pulse signals are inserted in each of the other time slots. Apparatus associated with the next source along the transmission system recognizes the location of the second time slot of the frame by examining the received signal to ascertain the existence of one of the predetermined signals in one time slot and a signal not having the characteristics of one of said predetermined signals in the preceding time slot. That apparatus then deletes the predetermined signal from the second time slot and inserts information pulses from the second source in that slot. This process is repeated by each source along the transmission line, with each source inserting its information in the succeeding time slot. The predetermined pulse signals function to not only prevent loss of timing information but also provide a moveable frame marker.

DETAILED DESCRIPTION

This invention will be more fully comprehended with the following descriptions taken in conjunction with the drawings in which, FIG. 1 is a block diagram of the apparatus associated with each data source for inserting the information from that source in a time slot of the transmission system;

DETAILED DESCRIPTION

Figure 1:
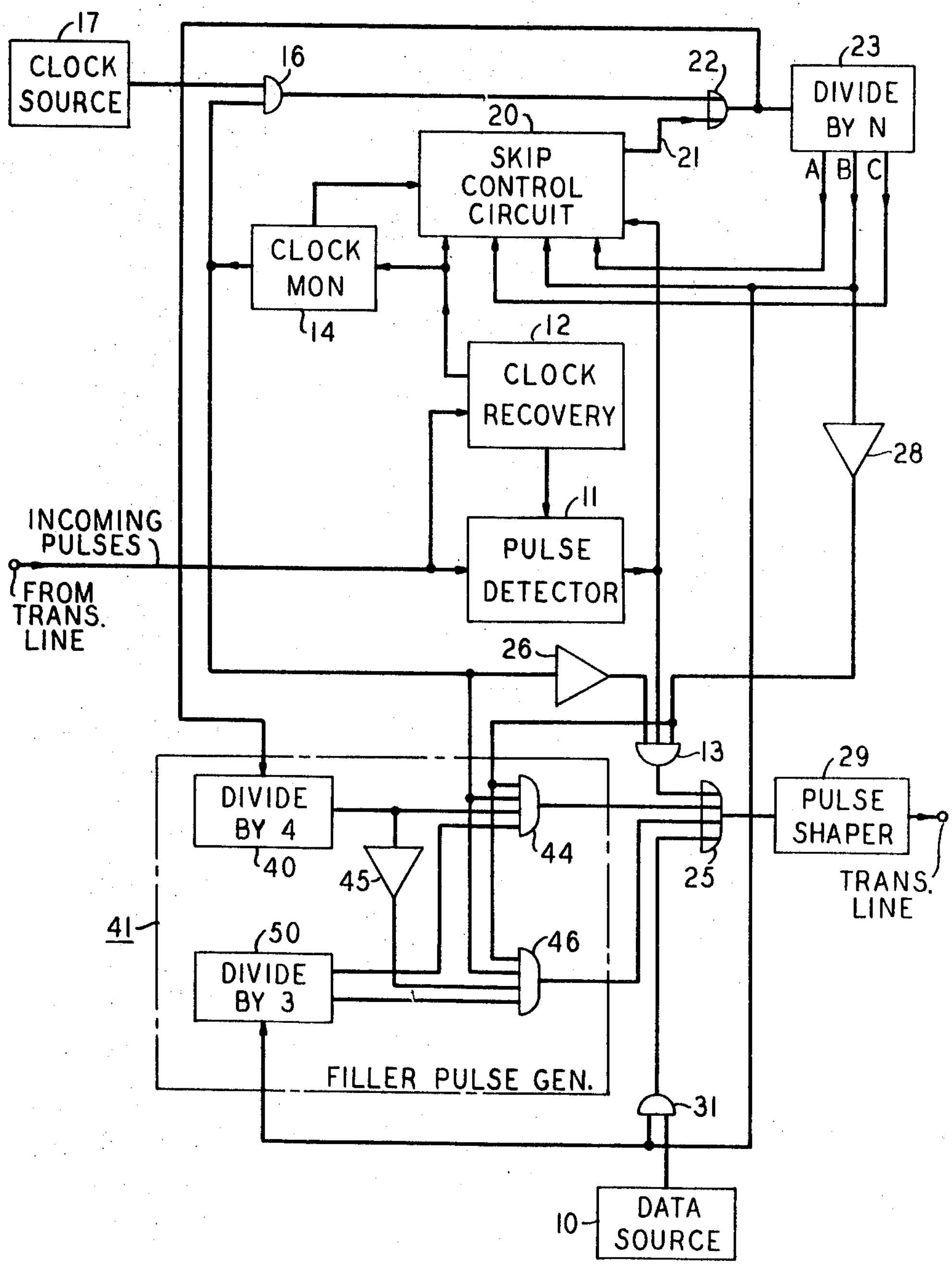

The apparatus for inserting information from a data source 10 on a transmission line is shown in FIG. 1. Assume initially that the data source 10 is located at a point along transmission other than the most distant point from the data receiver. In such a location, in accordance with this invention, the signal on the transmission line has been divided into frames of N-bits per frame and signals from the source most distant from the receiver have been inserted in a first bit of the frame, signals from the second most distant source have been inserted in the second time slot, etc. Further, in accordance with this invention, filler pulse signals have been inserted in all succeeding time slots with the pattern of the filler pulse signals either 110 or 001.

Figures 2, 3:
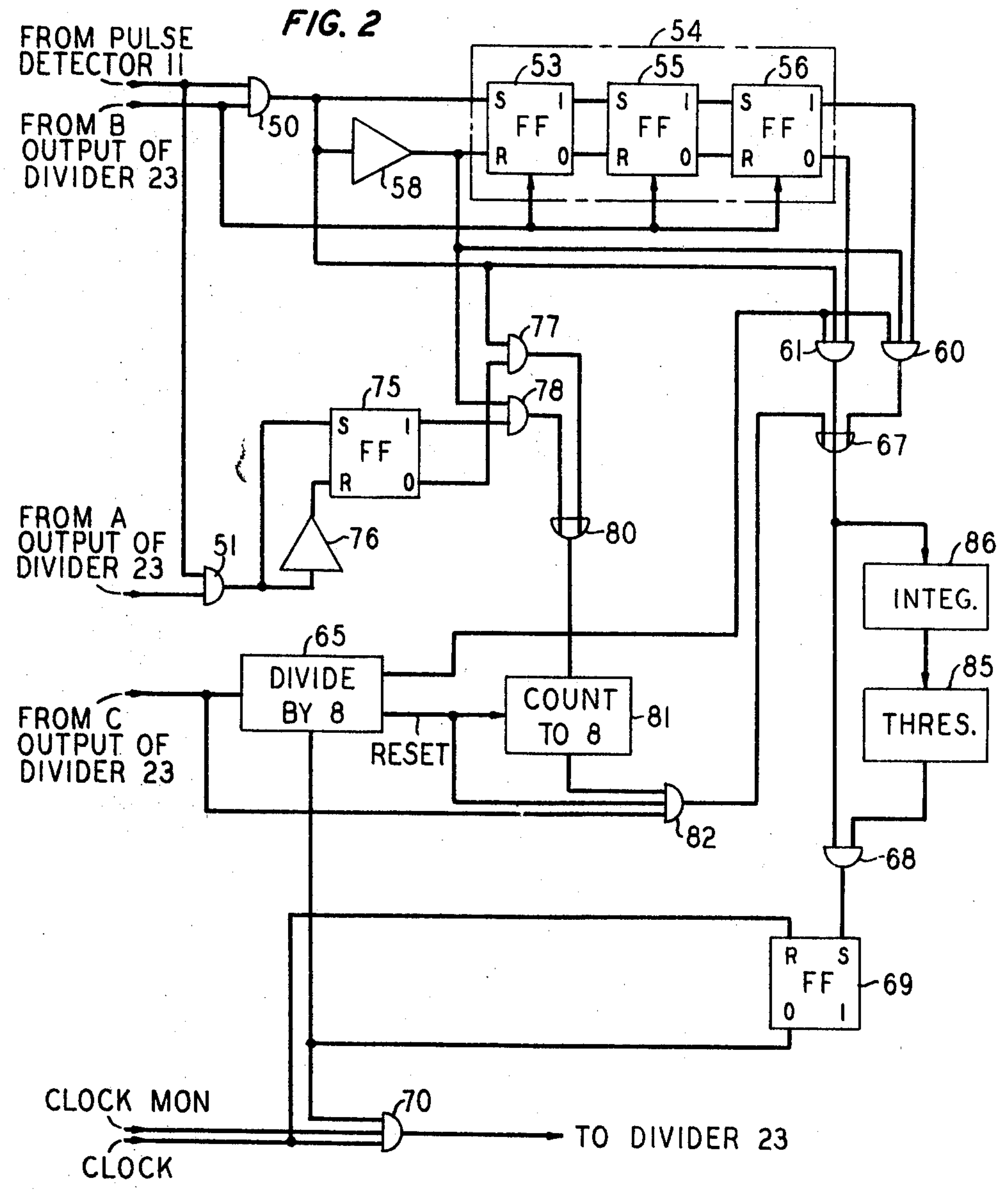
FIG. 2 is a block diagram of the skip-control apparatus shown in FIG. 1.
FIG. 3 is a chart showing the pulse patterns in a transmission system having 10 time slots in a frame.

The filler pulse signals serve two functions. First, they enable the apparatus shown in FIG. 1 to locate those time slots containing such signals. As a result, the apparatus is able to locate the time slot containing a filler signal which is adjacent a time slot containing data. Thus, the filer signals provide a moveable frame marker. The second function may most easily be ascertained by an examination of FIG. 3 wherein the vertical columns represent adjacent time slots of a frame containing 10 time slots and horizontal lines represent successive frames numbered, for purposes of illustration, one through eight. In FIG. 3 the signal illustrated is that which would be received from the transmission line at the third source and the first two time slots therefore contain data information which, since it is data, has no repetitive pattern. The third through 10th time slots, however, contain filler information with the third and fourth time slots containing the filler information having the pattern 110 repeated, the fifth and sixth having the repetitive patter 001 repeated, the seventh and eighth time slots having the pattern 110, etc. The result, as will be seen by examining a complete frame, as shown on a horizontal line, is that not more than two time slots elapse in which consecutive zeros are transmitted. This means that any self-timed repeaters along the transmission system will receive sufficient numbers of ones in order to maintain the proper operation of their clock-recovery circuits.

The incoming pulses from the transmission line are applied to a pulse detector 11 and a clock recovery circuit 12. The pulse detector 11, under control of timing pulses from clock-recovery circuit 12, makes a determination as to whether a "1" or a "0" is present in the incoming signal and if a "1" is present, generates a "1" which is applied to one input terminal of AND gate 13. The clock-recovery circuit 12, which may be a simple tank circuit tuned to the pulse repetition frequency of the transmission line, generates a clock signal which is applied to a clock monitor circuit 14, which is a threshold circuit that makes a determination of whether the level of clock-recovery signal, is sufficient to infer that incoming pulses are being received from the transmission line. If this determination is affirmative, i.e., indicating that an adequate level is being received, then the clock monitor circuit generates a zero which is applied to AND gate 16 to disable that gate, thereby preventing any signals from clock source 17 from being transmitted through gate 16. The function of clock source 17 will be described in detail hereafter.

Without discussing in detail the operation of the skip control circuit 20, which is shown in schematic form in FIG. 2, suffice it to say at this point that, at output terminal 21 of skip control circuit 20, there is generated a signal which occurs at the pulse repetition rate of the received signals from the transmission line. These signals pass through OR gate 22 and are applied to a divide by N-circuit 23 where N equals the number of data sources to be transmitted over the transmission line. Under the control of the skip control circuit 20, the divide by N-circuit 23 produces three consecutive pulse output signals denoted as A, B, and C in directly succeeding time slots of the transmitted signal. When correct timing has been established, pulse A occurs during the reception of the last received time slot containing data. Pulse B occurs during the first time slot of filler information which is the moveable frame marker. Pulse C is generated during the second time slot immediately succeeding the last transmitted time slot containing information.

All the incoming information and marker pulses received from the transmission line are transmitted through the path comprising detector 11, AND gate 13, and OR gate 25. AND gate 13 is enabled by a pulse present at the output of inverting amplifier 26 whenever a zero is present at the output terminal of clock monitor 14 which is applied to AND gate 16. During the presence of the moveable frame marker denoted by a pulse present at the B output terminal of divider 23, gate 13 is disabled because the pulse present at the B output terminal of circuit 23 is inverted by inverting amplifier 28 so that a zero appears at the output of amplifier 28 and disables gate 13. The result is that during all time slots of the received signal, information is transmitted through OR gate 25 to pulse shaper 29 and out tote transmission line. During the presence of the B time slot, the AND gate 31 is enabled so that data from data source 10 is applied through AND gate 31 and Or gate 25 to the pulse shaper 29 and, thence, to the transmission line. Thus the signal from source 10 is inserted in the first available time slot, denoted B, after the already present data signals.

If the incoming pulse stream from the transmission line fails for any reason, or if the apparatus shown in FIG. 1 is to be used in association with the source most distant from the receiver, then the circuit of FIG. 1 will assume system control. In such event, the output of the clock recovery circuit is below the threshold determined by monitor 14 which therefore generates a "1" at the output terminal connected to gate 16 and through amplifier 26 to gate 13. As a result, gate 13 is disabled and gate 16 is enabled so that the output of clock source 17 is fed through gates 16 and 22 to the divide by N-circuit 23 and to a divide by four circuit 40 which is part of the filler pulse generator. The divide by N-circuit determines the number of time slots in a frame on the transmission line and functions as stated above so that a pulse appears at the B output terminal once during each frame which enables gate 31 and inserts data from source 10 into that time slot of the frame.

The filler pulse generator 41 serves to generate the filler signals shown in FIG. 3. To accomplish this result, the clock pulses from gate 22 drive divider 40 whose output is a squarewave pulse train having a pulse repetition rate one-fourth that of the clock rate of the transmission line. The output from divider 40 is directly applied to one input terminal of an AND gate 44 and is also inverted by inverting amplifier 45 and applied to one input terminal of AND gate 46. The ground signal present at the B output terminal of divider 23 during all time slots, save that denoted as B, when inverted, serves to enable gates 44 and 46 in all time slots other than that denoted B. To insure that the filler pulse generator is operative only in the absence of a clock signal, the output from clock monitor 14 is also applied to gates 44 and 46. Thus, if enabled by the above stated signals applied to gates 44 and 46 and further enabled by divide by three circuit 50, gate 44 would produce the output signal 110011... while gate 46 would produce the output signal 001100....

Divide by three circuit 50 operates to enable gate 44 for two consecutive frames and to enable gate 46 for the third frame. Divide by three circuit 50 may be a three stage ring counter having an output that is "1" for two frames and "0" for one frame. One such output is applied to gate 44 and the inverse output to gate 46. The result of the alternate enablement of gates 44 and 46 for two consecutive frames of operation by gate 44 followed by one frame of operation by gate 46 is the generation of the filler pulse streams shown in FIG. 3. Thus, for example, the first and second frames in time slots 3 through 10 have the pattern 11001100, while the third frame has the pattern 00110011. The pattern is repeated in succeeding frames.

The skip control apparatus is shown in block diagram form in FIG. 2. The function of this apparatus is to cause clock signals to be fed into the divider circuit 23 of FIG. 1 in such a manner that Channel A is the latest message channel and channel B is the earliest marker channel. To accomplish this result, the apparatus shown in FIG. 2 makes the following determinations. First, it tests for the presence of marker, or filler, pulse sequence during the channel B tine interval. Second, it tests for a defined relationship between the signals present in channel A and channel B and if there is such a defined relationship then channels A and B must both contain filler information and the frame, as determined by divider 23, is not the desired frame. If either test fails, the apparatus then inhibits the application of a clock signal to divider 23 so that the divider skips one time slot and the new channels A and B are examined.

As shown in FIG. 1, the skip control apparatus receives input signals from the A, B, and C outputs of divider 23. In addition, it receives the output signal from the pulse detector circuit 11. Furthermore, it is supplied with a clock signal from the clock recovery circuit 12 and, in addition, receives a reference voltage signal from the output of the clock monitor 14 when the clock monitor has determined that the clock signal at the output of the clock recovery circuit 12 is adequate.

The pulse stream from detector 11 is applied to two ANd gates 50 and 51 which are enabled by the A and B outputs of divider 23 in succeeding time slots. The output of gate 50, which is enabled during each time slot of channel B, is directly applied to the set input terminal of a first stage 53 of a three-stage shift register 54 whose second and third stages are denoted by reference numerals 55 and 56 respectively. The output of AND gate 50 is also applied by means of an inverting amplifier 58 to the reset terminal 53 of shift register 54. As a result, the signals present in the B channel are shifted through the register 54 with the "1" output terminal of the last stage 56 being applied to one input terminal of gate 60 and the "0" output terminal of stage 56 being applied to one input terminal of gate 61.

A second input terminal of gate 60 is connected to the output of inverting amplifier 58 and a second input terminal of gate 61 is connected directly to the output of gate 50. The third input terminal of each of the gates 60 and 61 is connected to the output of a divide by eight circuit 65 which is connected to receive the signals generated at the C output terminal of divide by N-circuit 23. Divide by eight circuit 65 may be a three-stage binary counter and the output applied to gates 60 and 61 is from that stage in which a pulse in not generated during the reception of the first three pulses from the C output of divider 23 and in which a pulse is generated during the period of time between the fourth and seventh C output pulses from divider. As a result, the gates 60 and 61 are disabled during the first four frames but after these first four frames have past, gates 60 and 61 are enabled for a period of four frames with the enablement and disablement of these gates continuing at this rate. Gates 60 and 61 thus compare the signals present on the B channel at intervals of three frames. That is to say, the output of stage 56 of register 54 which is the signal present in a B time slot, having been delayed three frames is compared with the output of gate 50.

Reference to FIG. 3 shows that when comparing a filler pulse in one time slot of one frame with a filler pulse in the same time slot three frames later, these signals should be alike. When the signals are alike, no output will be delivered from gates 60 or 61. If the signals are unlike the filler pulse sequence is not in channel B. When the signals are unlike, either gate 60 or 61 will generate an output signal which is applied through an or gate 67 and a normally enabled AND gate 68 to set a bistable circuit 69. When the bistable circuit 69 is set, ground voltage appears at its zero output terminal to disable an AND gate 70 through which the clock pulses are normally applied to divider 23, gate 70 being normally enabled by a reference voltage from the clock monitor circuit indicating an adequate level of clock signal. The disablement of AND gate 70 lasts only one time slot because the next occurring clock signal from clock recovery circuit 12 resets bistable circuit 69. Operation of bistable circuit 69 also resets the divide by eight circuit to start a new cycle of tests.

The above-described operation determines whether the signal present in channel B is a filler signal and if it is not, the divider is retarded by inhibiting the application of one clock pulse to the divider 23. The result is that the next successive time slot is denoted as channel and the checking process is repeated.

If the check of time slot B is satisfactory, it is necessary to check for the presence of a data stream during the A time which is the time slot immediately preceding time slot B. To do this the signals in time slot A are compared wt the signals in time slot B. Referring to FIG. 3, if time slots A and B contain filler signals which are identical, such as would be the case if A and B were time slots 3 and 4, respectively, then there is a predetermined correspondence between the signals present in A and B, that is to say, they are identical. On the other hand, if time slot B contains filler signals as shown in time slot 5 of each frame ad time slot A contains the filler information shown in time slot 4, then there is also a predetermined relationship between A and B, that is to say, they are always unlike. Only when channel B contains marker information and channel A contains data information is there no predetermined relationship between the signals present in channel A and channel B.

The apparatus to be described below makes a determination as to whether the signals present in time slots A and B are either always alike or always unlike. If they are always alike or always unlike then the apparatus determines that the divider 23 must skip a time slot since time slot A does not then contain data information. On the other hand, if the signals present in channels A and B have no such relationship, and if the test for channel B is satisfied, then the apparatus has determined that time slot A, as determined by counter 23, is the last message signal and channel B contains the marker indicator.

To accomplish this result, the A output from divider 23 enables AND gate 51, whose output is employed to set a bistable circuit 75 and whose output is also inverted by an inverting amplifier 76 and applied to the reset terminal of bistable circuit 75. Bistable circuit 75 thus functions to store the data signal received during time slot A and gates 77 and 78 function to compare the signal present in time slot B with that present in time slot A. To accomplish this AND gate 77 is connected to receive the signal at the "0" output terminal of bistable circuit 75 and also the output from gate 50. Similarly, AND gate 78 is connected to the "1" output terminal of bistable circuit 75 and also to the output terminal of amplifier 58. If channel A contains a pulse, then gate 78 is enabled and if channel B contains a zero, a signal will then be transmitted trough gate 78, through gate 80 to a counter 81.Similarly, if channel B contains a pulse, gate 77 will be enabled and if channel A had contained a zero, the pulse output at the "0" output terminal of bistable circuit 75 will cause gate 77 to generate a pulse which is transmitted through OR gate 80 to e applied to counter 81.

Thus, gates 77 and 78 will generate output signals to be applied to the counter 81 if the signals in the A and B time slots are not alike. Like pulses in time slots A and B pass neither gate. If the pulses are always unlike, counter 81 will then count one pulse in each frame and after eight frames the counter 80 will read zero. Similarly, if the signals in time slots A and B are identical, then no pulses will be transmitted to counter 81 and after eight frames it will also read zero. However, if the pulse streams in time slots A and B are unrelated, i.e., a message exists in time slot A and a filler signal in time slot B, then counter 81 will have some other count than zero or eight. After eight counts, the divide by eight circuit 65 resets counter 81 and also enables gate 82 which will emit a pulse if counter 81 does read either zero or eight, this pulse indicating that marker pulses are present in time slots A and B. The output of gate 82 is applied to OR gate 67 which causes, as described before, a clock pulse to be inhibited from reaching divider 23. As a result, the divider 23 skips one time slot.

The skipping of time slots, as above described, continues until it is determined that time slot B contains markers and time slots A and B have no predetermined relationship to one another. This occurs only when time slot B contains the earliest occurring filler information and time slot A contains the last message information.

During the interval of searching for the correct framing time, gate 68 is enabled by threshold circuit 85, which is connected to receive a signal from an integrator circuit 86 which, in turn, receives its input signal from the output of gate 67. The threshold circuit maintains AND gate 68 in the enabled condition so long as the time rate of the output signals from OR gate 67 is sufficient to exceed a predetermined minimum. When the output of OR gate 67 falls below this predetermined minimum, then ANd gate 68 is disabled. Thus a few random errors resulting in an output from OR gate 67 will not cause the apparatus to skip one time slot and a predetermined number of such outputs must be generated by gate 67 in order to activate the skipping operation.

Thus in accordance with this invention the data signals from N geographically separated sources may be transmitted over a common transmission line to a common receiver. A moveable frame marker establishes the first available time slot in each frame in which data may be inserted and filler information in all time slots not containing data facilities the use of self-timed repeaters. In addition the apparatus associated with each data source to accomplish these results may be identical thus reducing costs. In addition in the event the line is cut then the apparatus associated with the data source immediately beyond the cut on the receiver side can reestablish the frame and give service for those sources between the cut and the data receiver.

It is to be understood that the above-described arrangements are merely illustrative of the application of the principals of the invention. For example, the time slots could be filled in the reverse order from that described herein. Numerous other arrangements may be devised by those skilled in the art without departing from the spirit and scope of the invention.

What is claimed is:

1. A pulse transmission system comprising, in combination, a plurality of N-sources of pulse information distributed along a digital transmission line connected between a first such source and a receiver, means at the first source to establish a frame of N-time-slots on said transmission line, means at said first source to insert pulse signals from said first source into a first time slot, means at said first source to insert predetermined pulse signals into all time slots except said first time slot, means at each succeeding pulse source between said first source and said receiver to ascertain the occurrence of an information signal and one of said predetermined signals in adjacent time slots and to delete said predetermined signal and insert a pulse information signal in that time slot.

2. Apparatus in accordance with claim 1 wherein said means at said first source to establish a frame of N-time-slots on said transmission line comprises a divide by N-circuit connected to receive clock signals from a local clock source having a pulse repetition rate equal to that of said transmission line and generate pulses in three consecutive time slots during each group of N time slots.

3. Apparatus in accordance with claim 2 wherein said means at said first source to insert predetermined pulse signals into all time slots except said first time slot comprises, a divide by four circuit connected to receive the signals applied to said divide by N-circuit, a pair of AND gates, means to apply the output of said divide by four circuit to one of said AND gates, means to invert the output of said divide by four circuit and apply the resulting inverted output signal to the second of said AND gates, a divide by three circuit, means to apply pulses at the frame rate to the input of said divide by three circuit, means to generate signals within said divide by three circuit that are "1s" for two frames and "0" for the next succeeding frame and apply said signal to one of said AND gates, means to generate in said divide by three circuit a signal that is "0"

for two frames and a "1" for the next succeeding frame and apply said signal to a second of said AND gates, and means to enable said two AND gates in all time slots except that which occurs when said second pulse of said group of three pulses is being generated by said divide by N-circuit.

4. Apparatus in accordance with claim 3 in which said means at each succeeding pulse source between said first source and said receiver to ascertain the occurrence of an information signal and one of said predetermined signals in adjacent time slots comprises, in combination, first apparatus to ascertain the presence of said predetermined signal in said time slot in which said second pulse of said group of three pulses is generated by said divide by three circuit, second apparatus to determine the existence of a predetermined relationship between the signals present in the first time slot of said group of three time slots in which pulses are generated by said divider circuit, and means to inhibit clock pulses from being applied to said divider which establishes said frame in the event said apparatus does not determine the presence of said signal, and means to inhibit clock pulses from being applied to said divider in the event said second apparatus fails to determined the existence of said predetermined relationship.